US009250077B2

(12) United States Patent
Comi et al.

(10) Patent No.: US 9,250,077 B2
(45) Date of Patent: Feb. 2, 2016

(54) GROUND-TRANSPORTATION NETWORK REPRESENTATION

(71) Applicant: Amadeus S.A.S., Sophia Antipolis (FR)

(72) Inventors: Marco Comi, Antibes (FR); Mike Galliera, Thorold (CA); Claudi Sanchez, Antibes (FR); Joel Cordesses, Antibes (FR)

(73) Assignee: AMADEUS S.A.S., Biot (FR)

( * ) Notice: Subject to any disclaimer, the term of this patent is extended or adjusted under 35 U.S.C. 154(b) by 160 days.

(21) Appl. No.: 13/969,856

(22) Filed: Aug. 19, 2013

(65) Prior Publication Data

US 2015/0051834 A1 Feb. 19, 2015

(51) Int. Cl.

| | |
|---|---|
| ***G01C 21/34*** | (2006.01) |
| ***G08G 1/123*** | (2006.01) |
| ***G01C 21/00*** | (2006.01) |
| ***B61L 27/00*** | (2006.01) |
| *G06Q 50/30* | (2012.01) |
| *B61L 25/08* | (2006.01) |

(52) U.S. Cl.

CPC ............ *G01C 21/00* (2013.01); *B61L 27/0011* (2013.01); *B61L 27/0055* (2013.01); *B61L 25/08* (2013.01); *G06Q 50/30* (2013.01); *G08G 1/123* (2013.01)

(58) Field of Classification Search

CPC ....... G01C 21/00; G06Q 50/28; G06Q 50/30; G06Q 10/08; B61L 27/011; G08G 1/123

USPC .................................................. 701/533, 540

See application file for complete search history.

(56) References Cited

U.S. PATENT DOCUMENTS

| | | | | |
|---|---|---|---|---|
| 5,623,413 | A | 4/1997 | Matheson et al. | |
| 5,794,172 | A | 8/1998 | Matheson et al. | |
| 6,154,735 | A | 11/2000 | Crone | |
| 2011/0022527 | A1* | 1/2011 | Onishi et al. | 705/317 |
| 2011/0112759 | A1* | 5/2011 | Bast et al. | 701/202 |
| 2013/0204527 | A1* | 8/2013 | Schilling et al. | 701/533 |
| 2013/0317747 | A1* | 11/2013 | Chidlovskii et al. | 701/540 |

FOREIGN PATENT DOCUMENTS

EP 1764280 A1 3/2007

* cited by examiner

*Primary Examiner* — Calvin Cheung
*Assistant Examiner* — Paula L Schneider
(74) *Attorney, Agent, or Firm* — Thompson Hine LLP

(57) ABSTRACT

Methods, apparatus, and computer program products for producing a representation of a ground-transportation network from timetable information of transportation services. By means of a computer, routing locations are determined from the timetable information. The routing locations include end points of the transportation services. Tuples of directly-connected routing locations are formed. Network paths are generated by linking the directly-connected routing locations. The entirety of these paths forming the representation of the ground-transportation network.

17 Claims, 8 Drawing Sheets

Train # IR 101:
OperationDays: 12345
MILAN: 09.00 (0 km)
BOLOGNA: 10.05 - 10.10 (220 km)
FIRENZE: 10.45 - 10.48 (360 km)
ROMA: 11.55 (640 km)

Train # IR 102:
OperationDays: 567
VENEZIA: 17.00 (0 km)
BOLOGNA: 18.35 (160 km)

Coach # EC 51
OperationDays: 1234567
L'AQUILA: 07.30
ROMA: 09.15

GROUND-TRANSPORTATION NETWORK REPRESENTATION

FIELD OF THE INVENTION

The invention relates to ground-transportation networks in general, and, in particular, to methods of producing a representation of a ground-transportation network, computer systems programmed to carry out the method, and non-transitory computer-readable storage media having corresponding computer program instructions stored therein.

BACKGROUND

Scheduling systems exist for moving plural objects across a rail system which includes a rail infrastructure, rolling stock, and personnel operating and maintaining the railway. However, improved methods, systems, and computer program products are needed for producing a representation of the network of the railway.

SUMMARY

According to one embodiment, a method is provided to produce a representation of a ground-transportation network from timetable information of transportation services on the ground-transportation network. The timetable information comprises end points, i.e. origins and destinations, and intermediate stop points of the transportation service. The method comprises, by means of a computer, determining routing locations from the timetable information, said routing locations comprising the end points of the transportation services, forming tuples of directly-connected routing locations, wherein tuples of directly-connected routing locations are pairs of routing locations connected by a transportation service with no intermediate routing location where the transportation service stops, and generating network paths by linking the directly-connected routing locations, the entirety of these paths forming the representation of the ground-transportation network.

According to another embodiment, a computer system is provided for producing a representation of a ground-transportation network from timetable information of transportation services on the ground-transportation network. The timetable information comprises end points, i.e. origins and destinations, and intermediate stop points of the transportation service. The computer system is programmed to: determine routing locations from the timetable information, said routing locations comprising the end points of the transportation services; form tuples of directly-connected routing locations, wherein tuples of directly-connected routing locations are pairs of routing locations connected by a transportation service with no intermediate routing location where the transportation service stops; and generate network paths by linking the directly-connected routing locations, the entirety of these paths forming the representation of the ground-transportation network.

According to another embodiment, a non-transitory computer-readable storage medium is provided having computer program instructions stored therein, which when executed on a computer cause a representation of a ground-transportation network to be produced from timetable information of transportation services on the ground-transportation network, wherein the timetable information comprises end points, i.e. origins and destinations, and intermediate stop points of the transportation services, by: determining routing locations from the timetable information, said routing locations comprising the end points of the transportation services; forming tuples of directly-connected routing locations, wherein tuples of directly-connected routing locations are pairs of routing locations connected by a transportation service with no intermediate routing location where the transportation service stops; and generating network paths by linking the directly-connected routing locations, the entirety of these paths forming the representation of the ground-transportation network.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
FIG. 1 is a map of Italy illustrating exemplary transportation services represented by timetable information.

Prior to a detailed description of exemplary figures, some more general exemplary items will be described.

A network representation is not the physical network itself but is, for example, an abstract logical presentation of the network, e.g. describing network nodes and links between the nodes in the form of a graph.

Ground transportation may include transportation by railway, bus, subway, and/or ship. Transportation services are, for example, transportation of passengers or freight from one point to another. The notion of a "(ground) transportation service" herein does not refer to an instance of a service, e.g. a single journey by train, bus, or ship at a particular date and hour. A specific "transportation service" rather refers to all the instances which have certain features in common. For example, in some embodiments a specific "transportation service" comprises all the instances operating at different dates and times of the same transportation type (train or bus; passenger or freight service) and the same starting points and terminal stop as one "transportation service". In other embodiments one or more further common features define what belongs to a "transportation service", e.g. the average speed of the service, which allows a distinction between, e.g. high-speed trains and normal (lower-speed) trains. Another optional distinction may be seen in the intermediate stops. In some embodiments all the instances with the same starting points and terminal stops belong to the same "transportation service", regardless of whether their intermediate stops coincide. In other embodiments, only instances in which all or some of their intermediate stops are identical belong to the same "transportation service".

A ground-transportation service has typically at least two stop points, a starting point, or origin, and a terminal stop point, or destination, which are collectively referred to as "end points". There may be non-stop services with stops at only these two end points. Other services may have one ore more intermediate stops between the end points. It is noted that the notion of a stop point (end point or intermediate stop point) is service-oriented, meaning that passengers or freight can board and/or leave the transportation service at a stop point. Operational stops, i.e. stops needed for the internal operation of the ground-transportation system (e.g. a train stopping before a signal) without enabling passengers or freight to board or leave the transportation service are not considered to be "stops", "stop points" or "end points" in the present context.

The production of the representation of the ground-transportation network is performed using timetable information of transportation services on the ground-transportation network as an information input. Transportation-service providers usually provide timetables to customers to furnish potential users of the service with detailed information about the respective service. Typically, the information provided by timetables includes end points and intermediate stop points (if any), and the date and time when the service leaves and/or arrives at the end points and stop points, i.e. departure and/or arrival times. The dates of periodically operating services may be specified explicitly by providing the dates, or implicitly by specifying the period of operation, such as "daily", "every working day", "on Sundays", etc.

The process of producing the representation of the ground-transportation network is based on "routing locations" derived from the timetables. The "routing locations" become the nodes of the graph representing the network representation. Each routing location corresponds to a stop point comprised in the entirety of all the transportation services in the timetables, but in some embodiments not all of the stop points are selected to become a "routing location". Thus, in the latter embodiments the set of routing locations is a proper subset of the set of stop points of all the transportation services. In some embodiments only the end points of the transportation services form "routing locations". In other embodiments certain intermediate stop points are also considered to be "routing locations", in addition to the end points. In still other embodiments all the stop points, i.e. the end points and all the intermediate stop points are considered to be "routing locations". This will be discussed in more detail below.

When the routing locations have been determined, tuples of directly-connected routing locations are formed. Two routing locations are connected if there is at least one ground-transportation service to which both routing locations belong. Two connected routing locations are directly connected if there is at least one service with no routing location at which the transportation service stops between the two routing locations at issue. In other words, even if the transportation service at issue has intermediate stops between two connected routing locations they are considered to be "directly connected", provided that none of the intermediate stops is (another) routing location.

When the tuples of directly-connected routing locations have been formed, network paths are generated. The generation of the network paths is performed by joining pairs of directly-connected routing locations which have a routing location in common. The entirety of these paths resulting from all the joined pairs possible form the representation of the ground-transportation network.

It is noted that, due to the fact that the generation of the network representation is based on timetables, the resulting network representation is not just the ground-transportation system's physical network, such as a map of railway tracks or roads. The network represented is rather service-oriented. It is, for example, a network representing travel opportunities for passengers and/or transport opportunities for freight. It does not, typically, include physical connections only used internally by the ground-transportation system. For example, physical rail or road connections only used for marshalling, shunting or switching, empty running etc. are not included. In some embodiments, only services of a particular service class or classes are considered, e.g. passenger transportation in high-speed trains. The resulting network representation in this case represents only the network of high-speed passenger trains. In some embodiments, only services with particular characteristics are considered, e.g. services accessible to handicapped people, or services opened to bicycle transportation. The resulting network representation in those case represents only the network of those services, e.g. accessible to handicapped people, or services opened to bicycle transportation, etc.

In some embodiments, all the activities indicated in the method claims are carried out automatically by a computer, without human intervention.

The naming of stop points in ground-transportation networks is not necessarily unique. For example, different stop points might have the same name in the timetables. In some embodiments unique location codes are assigned at least to the end points in the timetable information, and optionally to some or all of the intermediate stops. The unique location codes are then used when performing the method described herein. The assignment of unique location codes to the end points in the timetable information enables timetables to be used in which end points, and optionally intermediate stops, in the timetable information are not required to be identified in a unique manner.

Furthermore, the naming of stop points in timetables might also lack uniqueness in the sense that different service providers (e.g. different railway companies) might use different names for identical stop points in their timetables. The assignment of unique location codes to the end points in the timetable information helps to unambiguously identify identical end points, and, optionally, identical intermediate stops, served by different service providers. It enables timetables from different providers to be used in a combined manner, including timetables with non-unique designations of locations, or partial timetables, or non-accurate timetables.

Different embodiments vary in the degree of selectiveness with which stop points from the timetables are included as "routing locations" in the present method.

In some embodiments no selection as regards the routing locations is made. That means all the stop points (i.e. the end points and all the intermediate stop points) of the transportation services are taken as routing locations.

In other embodiments only the end points become routing locations. This reduces the number of tuples of directly connected routing locations, and thereby the number of network paths significantly. Thus, the computer processing time and the amount of data storage required to generate the network representation is also reduced significantly. This manner of selecting routing locations might appear very restrictive, because a service may have many intermediate stop points but only one starting point and one end point. However, as bigger cities usually have at least one service starting or ending at the city, such bigger cities will normally be included in the list of routing locations, even under this restrictive manner of selecting routing locations.

In other embodiments the restrictiveness in the selection of routing locations ranges between these two extremes by including some, but not all, of the intermediate stops points into the set of routing locations, in addition to the starting point and the end point. For example, the intermediate stop points included may be crossing points between services, i.e. intermediate stop points common to at least two transportation services. This still reduces the computer processing time and the amount of data storage required to generate the network representation, compared with embodiments in which every stop point is considered to be a routing location. However, compared with the "only-end-points" embodiments, it is ensured that connecting stations between different transportation services are included in the network representation.

In the latter embodiments, there may be cases in which two or more different transportation services do not only cross at a single crossing point but have a series of two or more common intermediate stop points. In some variants of these embodiments all of these common stop points are considered to be "routing locations". However, in order to reduce the required computer processing time and the amount of data storage needed, in other variants in transportation services with a sequence of two crossing points only one of theses crossing points is taken as a routing location, or with a sequence of more than two crossing points only two of these crossing points are taken as routing locations. For example, only the first and last of the series of common crossing points might be used as routing locations.

The generation of the network paths is prepared by joining pairs of directly-connected routing locations. In some embodiments this joining is performed by producing a graph of the transportation network by linking the routing locations with the routing location or routing locations to which they are directly connected. The nodes of this graph are the routing locations, and the edges of the graph are the (direct) connections between routing locations.

The entirety of the network paths is then determined by graph traversal. In some embodiments the graph traversal is a depth-first search, in other embodiments it is a breadth-first search. For example, in a depth-first search the traversal is performed by repeatedly starting from a node of the graph and visiting the nodes in each branch as far as possible, excluding visiting the same node. Each of these traversals yields one network path. Repeating this for all the branches accessible from one starting point yields all the network paths from the node used as the starting point. In a breadth-first search, the traversal, starting from the node at issue, inspects all the nodes that neighbor the currently visited node, and connects the currently visited node and its neighboring nodes which were unvisited to build up network paths in parallel. Then for each of those neighboring nodes in turn, it inspects their neighboring nodes which were unvisited, and so on.

In both the depth-first and the breadth-first traversals this action is repeated by using all the nodes of the graph as starting points. As a result, all the routing locations in the graph are visited using all the routing locations as starting points, thereby finding all the network paths in the graph. In general, a graph may have cycles. However, cyclic network paths are excluded by prohibiting the same routing location from being visited twice for the same network path.

In some embodiments there may be additional "exit" conditions for the graph traversal, besides the requirement that cycles should be excluded. For example, in some embodiments the maximum length of the network paths determined in this manner is limited. The length of a network path can be expressed by the number of nodes traversed, i.e. the routing locations traversed. Thus, in some embodiments the network paths thus determined do not have more routing locations than a given maximum number of routing locations. The meaning of this length limitation is that the maximum number of potential changes between transportation services for a passenger or merchandise moving through the network is limited.

Timetables often include additional information relating to stop points and their links, travel time, and/or the transportation service. In some embodiments the additional information comprises at least one of (i) a distance between two locations, (ii) a travel time of a transportation service between two locations, (iii) a level of service onboard a transportation facility providing a transportation service, (iv) a level of access to the transportation facility, and (v) price of the transportation service. For example, service onboard may relate to catering, Internet connectivity, etc. Information on barrier-free access to services may be relevant to certain user groups, such as handicapped users. Some embodiments include the activity of logically associating the additional timetable information with the representation of the ground-transportation network. The activity of logically associating the additional information may comprise logically linking it to routing locations and/or connections (segments) between routing locations.

In some embodiments additional information is not explicitly included in timetables but is derived from information provided by the timetables. For example, the mean travel speed between two stop points can be calculated using the distance between the two stop points indicated in a timetable, and dividing it by travel time between the two stop points (which in turn can be calculated by the difference between the time of arrival at the second stop point and the time of departure from the first stop point; these times normally being indicated in the timetable).

Accordingly, in some embodiments a travel-speed classification is performed for segments of the ground-transportation network, on the basis of the additional distance information and travel-time information. The travel-speed classification may then be logically associated with the corresponding segments in the representation of the ground-transportation network, as described above for other additional timetable information. Based on the travel-speed classification, it may become possible to choose only transportation service connections with a certain speed classification, e.g. very high speed railway, high speed railway, or traditional railway, for a travel route.

In some embodiments, a specific network representation is built, based on filtering transportation services by one or more additional information items, which are available or computed, e.g. from the timetable information.

The process of producing a representation of a ground-transportation network can be performed from scratch, i.e. without using information from previous productions. Since a transportation network may develop in the course of time, in the process of producing an updated network representation routing locations and/or tuples of directly-connected routing locations may be used which have already been determined in previous network production runs. Such routing locations and tuples of directly-connected routing locations are also referred to as "already existing routing locations" and "already existing tuples of directly-connected routing locations". Accordingly, in some embodiments routing locations determined from new timetable information are added to already existing routing locations, so that the existing routing-location information is updated. Likewise, tuples of directly-connected routing locations determined from new timetable information may be added to already existing tuples of directly-connected routing locations, so that information about existing directly-connected routing locations is updated.

Updating of the network representation may also include removing outdated routing locations and pairs of directly-connected routing locations, and thereby outdated network paths. "Deleted" parts of the network can be determined by comparing a current instance of the network, e.g. the current pairs of directly-connected routing locations, with the corresponding pairs of a recently produced instance of the network.

The update mechanism may also be used to evaluate the maturity of a network representation. If a given number of new timetables for the representation of a network do not induce changes in the network representation, the network may be considered to be mature. It may then be assigned to a "maintenance state" in which updating is only performed periodically, e.g. once per year, by updating the routing locations and directly-connected routing-location tuples by including the new timetables issued during the last update period, and by generating a new network representation based on these updated data. On the other hand, if a network representation still continues to change with the inclusion of new timetables, the network has not yet reached a steady, mature state, but can still be assigned to an "incremental state", in which each new timetable triggers the update of the routing locations and directly-connected routing-location tuples and the generation of a new network representation. The assignment of the "maintenance state" or the "incremental state" may, in some embodiments, refer to the complete network; in other embodiment different assignments may be made to different parts of the network, e.g. such that the maintenance state is assigned to one or more parts of the network, and the incremental state is assigned to one ore more other parts of the network.

The process of generating a representation of a ground transportation network can also be performed on an incomplete set of timetables, or on non-accurate timetables. In these cases the incremental state is used to enrich the already existing network representation incrementally, and/or the remove errors, and/or the make the network representation more accurate.

In some embodiments updating of an existing network representation does not, or not only, refer to the inclusion of new routing locations and directly-connected routing-location tuples, but also refers to the inclusion (or updating) of additional information from the new timetables. In an analogous way to what has been discussed above additional information is determined or derived from the new timetables, this additional information comprising at least one of (i) a distance between two locations, (ii) a travel time of a transportation service between two locations, (iii) a level of service onboard a transportation facility providing a transportation service, (iv) a level of access to the transportation facility, and (v) a travel-speed classification. The additional information is either associated with the new or already existing routing locations and/or the new or already existing directly-connected routing-location tuples, or it updates additional information which was already associated with the already existing routing locations and/or already existing directly-connected routing-location tuples.

In some embodiments all the activities comprised in the method of producing a representation of a ground-transportation-network are performed automatically my means of a computer system, e.g. the computer system described herein.

The network representation thus obtained can, for example, be used as a basis for a journey planner. A journey planner is a software component responsible for computing travel proposals (direct or indirect) between one or more transportation locations. The network representation can be considered as a cached representation of connections between locations, and can be used, along with timetables and availability information, as an input to a journey planner to compute travel proposals.

The network representation thus obtained can also be used to produce electronic maps of the network (complete or partial maps), or any graphical screen display of the network.

Some embodiments relate to a computer system for producing a representation of a ground-transportation network from timetable information of transportation services on the ground-transportation network. The computer system is programmed with a computer program stored on a non-transitory computer-readable storage medium of the computer system, for example a magnetic or optical data disk. The computer program has instructions, which, when executed on the computer, cause one or more of the methods described herein to be carried out. For example, the instructions cause the computer to produce a representation of a ground-transportation network to be produced from timetable information of transportation services on the ground-transportation network, by: determining routing locations from the timetable information, said routing locations comprising the end points of the transportation services; forming tuples of directly-connected routing locations, wherein tuples of directly-connected routing locations are pairs of routing locations connected by a transportation service with no intermediate routing location where the transportation service stops; generating network paths by linking the directly-connected routing locations, the entirety of these paths forming the representation of the ground-transportation network.

Other embodiments relate to the computer program itself. In some of these embodiments the computer program is in the form of computer program instructions stored on a non-transitory computer-readable storage medium.

The method described herein is a fully automated procedure to build all the possible and meaningful network connections for one or multiple providers (that may share locations) using their timetables. Also, the process described allows improving and keeping up to date the network representation by processing new timetables made available by the providers.

The method described involves the identification from possibly a big volume of timetables, a consistent, reliable and non-duplicated subset of link information between locations in a transportation system. This is achieved by: determining which the routing locations are; determining which routing locations are directly connected to each other, along with additional information like distance and travel time; computing all meaningful routes between any two routing locations in the system.

It is assumed that timetable information is available, e.g. in a repository with a common format across all the transportation providers to be included in the network representation. Typically, different providers provide timetable information in different formats. As a preliminary activity, timetable information may be provided from different service providers and stored in a database within a common format.

The method to produce a representation of a ground-transportation-network is now further described by means of examples which are illustrated by the figures. It is noted that this description and the figures explain general aspects of the invention by way of example only, but are not the invention itself.

Exemplary Transportation Service Represented by Timetable Information; FIG. 1:

While the timetable information used to produce a representation of a ground-transportation-network will typically contain information about thousands of different transportation services the following exemplary description is simplified in that it includes only three different transportation services.

Accordingly, the exemplary FIG. 1 visualizes three different ground-transportation services, here for example in Italy. The exemplary case considered includes intermodal transportation services, namely rail services and coach services. In this example, timetables from two transportation providers providing different types of transportation services, rail and coach, are included: for example, Italian Rail (code IR) which operates trains, and Euro Coaches (code EC) which operates coaches. The information characterizing these three transportation services is included in the labeling of FIG. 1. FIG. 1 also visualizes the timetable information in the form of a map of Italy with the three services shown as lines connecting geographic locations in the map.

In this example, the following transportation services are available: Train # IR 101, running on weekdays from Milan ("Milano", or "MIL" in the figures) to Rome ("Roma", or "ROM") stopping in Bologna and Florence ("Firenze", or "FIR") (solid line); Train # IR 102, running on weekends and Fridays from Venice ("Venezia", or "VEN) to Bologna ("BOL") without intermediate stops (dashed line); Coach # EC 51, running every day from Rome to L'Aquila ("ACQ") without intermediate stops (dash-dotted line).

Assignment of Unique Global Location Codes:

In practice, transportation locations (e.g. stop points) may be shared between providers but identified with different code sets. In some embodiments the locations are identified with a global unique code set enabling these codes to be mapped to and from provider-specific codes.

For example, the method assigns unique global location codes to all the stops of the different services, for example three letter codes, such as "MIL" to Milano Station IR, "BOL" to Bologna Station IR (BOL), "FIR" to Florence Station, "VEN" to Venice Station IR, and "ACQ" to L'Aquila Terminal EC. In some embodiments different stations in the same city are assigned the same unique global location code, such as "ROM" to both Rome Station IR and Rome Termini EC.

The result of the assignment is as follows:

TABLE 1

| Provider location code | Global unique location code |
|---|---|
| Milano Station IR | MIL |
| Venezia Station IR | VEN |
| Bologna Station IR | BOL |
| Firenze Station | FIR |
| Roma Station IR | ROM |
| Roma Termini EC | ROM |
| L'Aquila Terminal EC | ACQ |

Determination of Routing Locations:

As indicated supra, there are different alternative definitions of routing locations. Alternative embodiments use the following criteria to define routing locations:

(i) all the stop points, i.e. the end points and all the intermediate stop points of the transportation services are taken as routing locations;

(ii) the end points and crossing points, i.e. only the end points and common stop points of at least two transportation services are taken as routing locations;

(iii) only the end points are taken as routing locations.

The criterion (iii) is the most restrictive one. It is an attempt to infer from the timetable information only the most "important" locations in the network. It relies on the fact that typically transportation services often originate from, and/or are destined for "important" locations, such as major cities.

Only as an example, and without limiting this description to the criterion (iii), an exemplary embodiment in which routing locations according to the criterion (iii) are used is now described in more detail. It includes activities as follows: retrieve, e.g. from a timetables repository, the first and the last location served by the various transportation services, for the one or more transportation providers; create a list, without duplicates, of their global unique location codes. In an exemplary implementation the list is created by using an appropriate data container for sets (e.g. std::set for C++ implementations); compare those location codes with the routing location codes already known by the system; store new routing location codes (=routing locations not yet known by the system) into the system.

Using the timetable information of the exemplary transportation services of FIG. 1 as an input, this process recognizes MIL, VEN, BOL, ROM, and ACQ as routing locations, because these are the stations which form the set of end points of the transportation services of FIG. 1. Since FIR is no end point of any of the transportation services of FIG. 1 it is not recognized as a routing location.

Table 2 displays, for all transportation services of FIG. 1, an overview of the transportation provider's location codes of the stop locations, the assigned global unique location codes, and whether or not a stop location is a routing location:

TABLE 2

| Provider location code | Global location code | Routing location |
|---|---|---|
| Milano Station IR | MIL | YES |
| Venezia Station IR | VEN | YES |
| Bologna Station IR | BOL | YES |
| Firenze Station | FIR | NO |
| Roma Station IR | ROM | YES |
| Roma Termini EC | ROM | YES |
| L'Aquila Terminal EC | ACQ | YES |

Determination of Directly-Connected Routing Locations:

Having determined the routing locations, the process creates a list of tuples, or pairs, of routing locations which are directly connected by at least one transportation service. The list created is free of duplicates.

Two routing locations are "directly connected" if one of the following conditions is true: at least one transportation service runs from the first routing location considered to the second routing location considered without any intermediate stops; or at least one transportation service runs from the first routing location considered to the second routing location considered with one or more intermediate stops, but none of these stops is a routing location.

In other words, two routing locations are "directly connected" if there is at least one transportation service running from the first routing location considered to the second routing location considered with no intermediate routing location where the transportation service stops.

This definition is independent from what is considered as a "routing location". Accordingly, it applies to embodiments in which the routing locations are determined according to any of the criteria (i), (ii), or (iii).

In an exemplary implementation, the activities to create a list of directly-connected routing locations, following the activities to find a list of routing locations, may be as follows:

Initialize a data container to contain elements composed by a pair of global location codes; it may be a data container for sets not allowing duplicate entries of set elements, i.e. no duplicate entries of pairs of routing locations (e.g. std::set for C++ implementations). In some embodiments the elements may include additional information, e.g. travel time or distance between the two locations represented by the two location codes;

Fill this structure with all the pairs of directly-connected routing locations already known by the system at current time;

Retrieve the list of routing locations known in the system;

Retrieve, from the timetables repository, all transportation services, for one or more transportation providers, along with their intermediate stops;

For each transportation service:

(i) Select the departure location; this is for sure a routing location; retrieve its global location code;

(ii) Iterate through the stops of the transportation service, in sequential order according to the service, until the next routing location is found; retrieve its global location code. At this point a pair of directly-connected routing locations has been found;

(iii) Put the two location codes in alphabetic order; example: PAR-MRS thereby becomes MRS-PAR. This is because network information is independent of the direction of travel: if a link between two locations exists, then it is considered valid for both directions;

(iv) Store this pair of directly-connected routing locations in the data structure (if not already known by the system at current time);

(v) Repeat the same procedure for the remaining stops of the transportation service;

At the end of the process, store the new pairs of directly-connected routing location codes in the system.

Table 3a displays a list of pairs created with this method of directly connected routing locations for all the exemplary transportation services of FIG. 1 and the exemplary list of routing locations shown in Table 2. An identifier ("Pair ID") is added to each of the directly-connected location pairs:

TABLE 3a

Directly-connected routing locations pairs

| Pair ID | location_1 | location_2 |
|---|---|---|
| 1 | BOL | MIL |
| 2 | BOL | VEN |
| 3 | BOL | ROM |
| 4 | AQU | ROM |

Determination of Additional Information with Respect to Directly-Connected Routing Locations In some of these exemplary implementations additional information may be extracted from the timetables (if present) during the determination of the directly-connected routing locations (e.g., as described above) and stored along with the respective routing location pairs. The additional extracted and stored information may be: the distance between two directly-connected routing locations; and/or the minimum travel time between two directly-connected routing locations.

Every time a pair of directly-connected routing locations (such as a pair of "location_1" and "location_2" in Table 3) is found by the above process, the following additional activities may be performed:

Read from timetable the departure date/time from location_1 and the arrival time at location_2. Compute the difference between the two values to obtain the travel time;

If the pair (location_1, location_2) was not known by the system, simply store the computed travel time along with the pair;

If the pair was already known by the system, compare the computed travel time with the existing one. If the computed travel time is shorter than the already known travel time, override the existing one with the new one, otherwise keep the old one;

and/or:

If present, read from timetable the distance between location_1 and location_2;

If the pair (location_1, location_2) was not known by the system, simply store the distance along with the pair;

If the pair was already known by the system, override the existing one with the new one, otherwise keep the old one. In an alternative implementation, compute and store the average value between the previously known distance and the new distance; in this way, the new and the old distance values are both considered with the same weight. The goal thereby is to incrementally improve the accuracy of the distance;

The exemplary Table 3b displays a list of pairs created with this method of directly connected routing locations corresponding to Table 3, with the addition of the distance and the minimum travel time between two directly-connected routing locations to be stored along with the respective routing location pairs ("N/A" indicates that the information is not available):

TABLE 3b

Directly-connected routing locations pairs with additional information

| Pair ID | location_1 | location_2 | Distance (km) | Min travel time (min) |
|---|---|---|---|---|
| 1 | BOL | MIL | 220 | 65 |
| 2 | BOL | VEN | 160 | 95 |
| 3 | BOL | ROM | 420 | 105 |
| 4 | AQU | ROM | N.A. | 105 |

In other exemplary implementations further additional information is retrieved from the timetables and stored, for example:

Network utilization information, e.g. how many transportation services run on a particular track, i.e. between any two given routing locations;

Overall network statistics; e.g.: What percentage of tracks conveys only one service; What are the tracks with most traffic (number or transportation services); How does the utilization of a network (or portions of it) evolve over time;

Level of service onboard the transportation service;

Level of access to the transportation service.

Automated Track-Speed Classification

In further exemplary implementations an automated track-speed classification is based on the distance and minimum travel time information. Once the process has been able to retrieve distance and minimum travel time information for a segment (defined by two directly-connected routing locations) of a transportation service, a speed certification is attributed to the segment of the transportation service, based on the result of the division of the segment length (distance between the two directly-connected routing locations) by the minimum travel time for the segment at issue. The track speed classification may be limited to railway services.

Table 4 shows an exemplary speed classification rule:

TABLE 4

| Speed classification rule | |
|---|---|
| Speed | Classification |
| >240 km/h | Very high speed railway |
| between 180 and 240 km/h | High speed railway |
| <180 km/h | Traditional railway |

Based on a speed classification rule of that sort, the distance and minimum travel time information extracted from the time tables is used to perform a track speed classification for the individual segments. Since the travel time information on which the classification is based reflects the minimum travel time of the various services on the segment considered, the resulting track-speed classification does not certify that all transportation services running on that segment are, for example, high speed; it rather indicates that the track is capable of conveying services at least at the speed indicated by the classification.

The exemplary Table 3c displays a list of pairs of directly connected routing locations along with distance and the minimum travel time information according to Table 3b, with the addition of track-speed classification for the segments between two directly-connected routing locations. This track-speed classification is stored along with the respective routing location pairs and, optionally, distance and the minimum travel time information ("High speed" and "Traditional" are short forms of "High speed railway" and Traditional railway" in Table 4):

TABLE 3c

Directly-connected routing locations pairs with track-speed classification

| Pair ID | location_1 | location_2 | Distance (km) | Min travel time (min) | Track-speed classification |
|---|---|---|---|---|---|
| 1 | BOL | MIL | 220 | 65 | High speed |
| 2 | BOL | VEN | 160 | 95 | Traditional |
| 3 | BOL | ROM | 420 | 105 | High speed |
| 4 | AQU | ROM | N.A. | 105 | N.A. |

Generation of Network Paths

The network paths are generated on the basis of the directly-connected routing locations determined. The activities of determining additional information and/or classifying the track speed are optional; they can be performed, but need not be performed before generating the network paths.

Starting from the list of pairs of directly-connected routing locations, the process generates a new list of all the possible paths between any two given directly-connected routing locations.

In an exemplary implementation the generation of network paths takes the following inputs:

The list of directly-connected routing location pairs; and optionally, the maximum length of a network path (number of intermediate routing locations along the path), to filter out network paths with too many potential transportation service changes. In some embodiments this value can be chosen by a system administrator.

Figure 6:
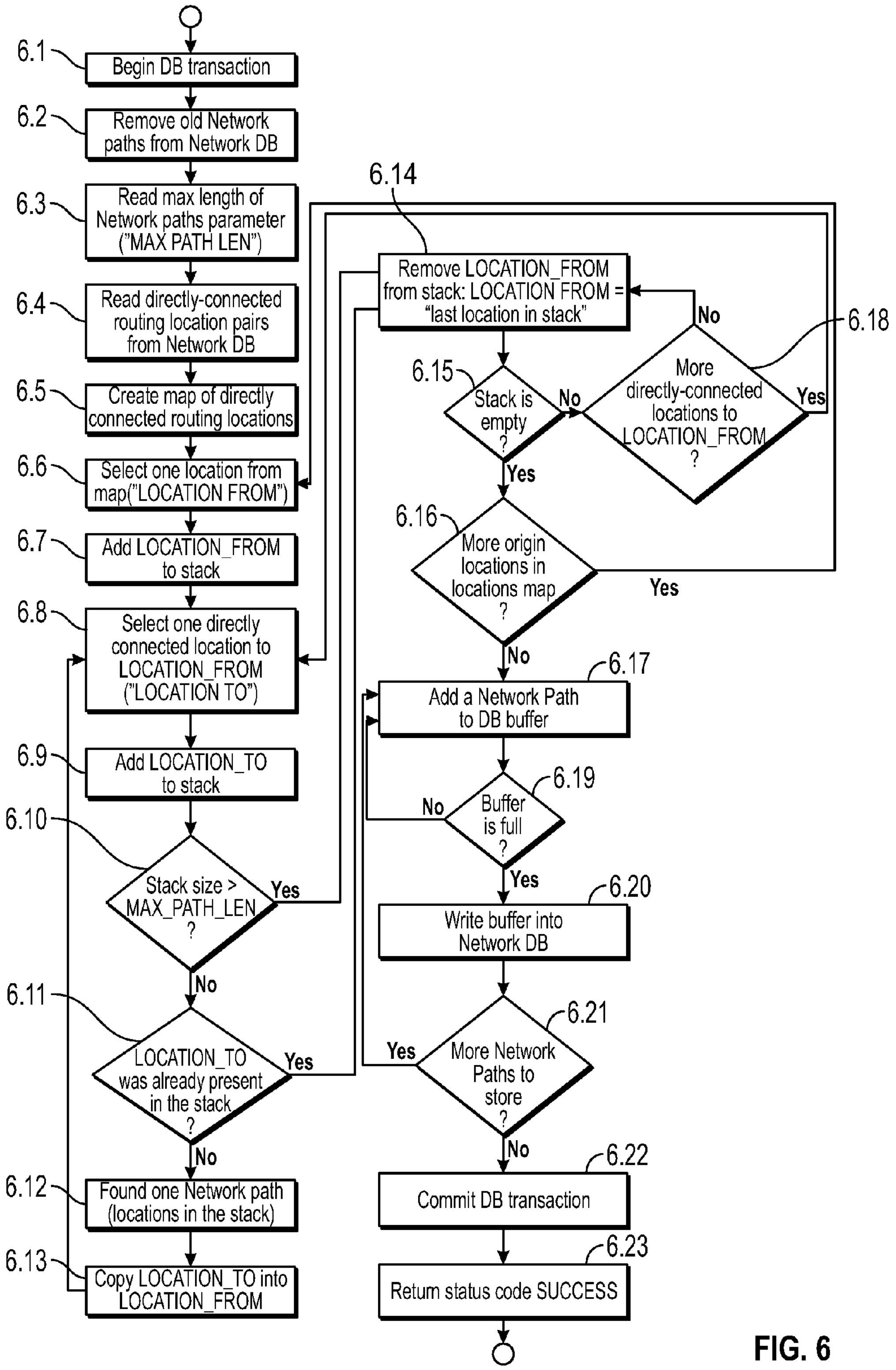
FIG. 6 shows an exemplary workflow of a network paths builder.
Figure 7:
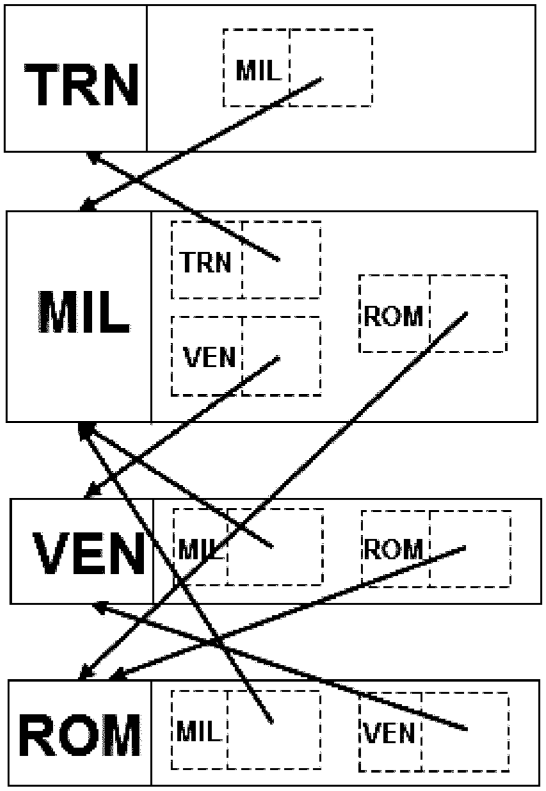
FIG. 7 illustrates an exemplary adjacency map.

In an exemplary embodiment of the method a graph of directly linked routing locations is constructed in analogy to depth-first graph traversing. This method is also illustrated by FIGS. 6 and 7, and is further described below under the heading "Exemplary workflow of the network paths builder 5". The exemplary method proceeds as follows:

Create a data structure network_link whose fields are: (i) Target location global code; (ii) Travel time to target location (optional); (iii) Distance to target location (optional);

Initialize a map of items whose key is a global location code and whose value is a list of network_link objects;

Read the list of all routing location codes known by the system;

Create a new item on the map for each routing location found;

Read pairs of directly-connected routing locations; for each pair (location_1, location_2):

(i) Find the item whose key is location_1 code on the map;

(ii) Add to this node a network_link object having: As target location global code, the code of location_2; As travel time, the minimum travel time between location_1 and location_2 (optional); As distance, the distance between location_1 and location_2 (optional);

(iii) Find in the map the item whose key is location_2 code;

(iv) Add to this node a network_link object having: As target location global code the code of location_1; As travel time, the minimum travel time between location_1 and location_2 (optional); As distance, the distance between location_1 and location_2 (optional);

At the end of the above process, remove from the map those routing locations having no links to any other location (no network_link objects) (this activity is optional because routing locations with no link may be implicitly excluded by the definition of "routing location");

For each routing location still on the map, discover all the possible paths to other routing locations by recursively finding directly-connected locations:

(i) From a location on the map, visit one by one each network_link object; for each network_link object visited the process has found a path of length 2: Starting from the network_link object, find the relative target location node on the map and repeat the same operation recursively; the process will then find paths of length 3, 4, . . . ;

(ii) During the recursion, a stack is maintained to avoid cycles (avoid visiting the same location twice for the same path). Every time a location in the path is recursively found, the location code is added to the stack;

(iii) At the same time, information of each valid path found so far (locations visited in order, distance and travel time information (optional)) is stored in the system;

(iv) Recursion goes on until one of these exit conditions is found true: The maximum length of the path is reached (stack size); A cycle is found (last visited location already present in the stack);

(v) If recursion stops, the following sequence of the process applies: Remove the last visited location from the stack; Resume recursion from the previous location in the stack;

(vi) If the stack is empty, this means that the process has discovered all valid paths starting from the initially chosen origin location on the map; the process then applies the same procedure to the next location on the map.

The result of this exemplary process, a list of all possible paths between any two directly connected routing locations for the transportation services illustrated in FIG. 1 is presented in Table 5. An identifier ("Network Path ID") is added to each of the network paths found:

TABLE 5

| Network paths | | | | |
|---|---|---|---|---|
| Network path ID | Network path | | | |
| 1 | MIL | BOL | | |
| 2 | MIL | BOL | VEN | |
| 3 | MIL | BOL | ROM | |
| 4 | MIL | BOL | ROM | AQU |
| 5 | BOL | MIL | | |
| 6 | BOL | VEN | | |
| 7 | BOL | ROM | | |
| 8 | BOL | ROM | AQU | |
| 9 | VEN | BOL | | |
| 10 | VEN | BOL | MIL | |
| 11 | VEN | BOL | ROM | |
| 12 | VEN | BOL | ROM | AQU |
| 13 | ROM | AQU | | |
| 14 | ROM | BOL | | |
| 15 | ROM | BOL | VEN | |
| 16 | ROM | BOL | MIL | |
| 17 | AQU | ROM | | |
| 18 | AQU | ROM | BOL | |
| 19 | AQU | ROM | BOL | VEN |
| 20 | AQU | ROM | BOL | MIL |

Refinement and Maintenance of Network Representation

A network representation may initially be produced from scratch, i.e. without using already known routing locations and/or directly-connected pairs of routing locations.

Having created an initial network representation based on an initial set of routing locations and pairs of directly-connected routing locations, an updated network representation may be produced, e.g. by newly adding routing locations and pairs of directly-connected routing locations derived from new timetables to the already existing sets of routing locations and pairs of directly-connected routing locations.

The updating of a network representation may be triggered, for example, by the receipt of new timetables, or periodically, or on demand.

In some embodiments, triggering the updating by the receipt of new timetables may be used during a period called the “incremental phase”, while triggering the updating periodically or on demand may be used during a period called the “maintenance phase”.

In some embodiments the incremental phase and the maintenance phase are combined to form a two-phase approach in order to refine the network representation in the incremental phase and, once it is mature enough, to maintain it updated, in the maintenance phase. In some embodiments the two phases may apply independently to the various transportation providers; this means that the network representation can be in the incremental phase with respect to a provider X and in the maintenance phases for another provider Y During the incremental phase, the network builder (=a process that generates a network representation) is run upon every acquisition of new timetables for a given provider. The network builder, for example, will be triggered at end of the acquisition of each new timetable for the provider at issue. The network representation is then updated for this network provider.

During the maintenance phase, there is no need to run the network builder upon every new timetable acquisition. It is sufficient to run the network builder and thereby update the network representation periodically (e.g. once a year) to ensure that the network representation is maintained reasonably up-to-date. During this phase, for example, the network builder is started by a job scheduler once per period for all the transportation providers which are in the maintenance phase. The period is not necessarily fixed but, in some embodiments, may be adapted to the variance of timetables over time.

The occurrence of changes in the network representations produced subsequently during the incremental phase can be used as a diagnostic tool to assess when the network has matured and a transition should be made from the incremental phase to the maintenance phase. For example, when a new transportation provider is considered, the incremental phase lasts until, after acquiring new timetables a certain number of times, there are still changes in the network representation induced by those timetables (e.g. new routing locations or directly-connected pairs). By contrast, when the acquisition of sequential versions of timetables does not lead to any further changes in the network representation, the network has matured and the incremental phase is considered to be completed. For example, the incremental phase can be maintained until a given number of new timetables in succession do not induce changes in the network representation; the given number, for instance may be a number between 2 and 5, for example 3.

In some embodiments, the updating process may also be manually triggered, for example if it is found that network paths are missing in the existing network representation.

Figure 2:
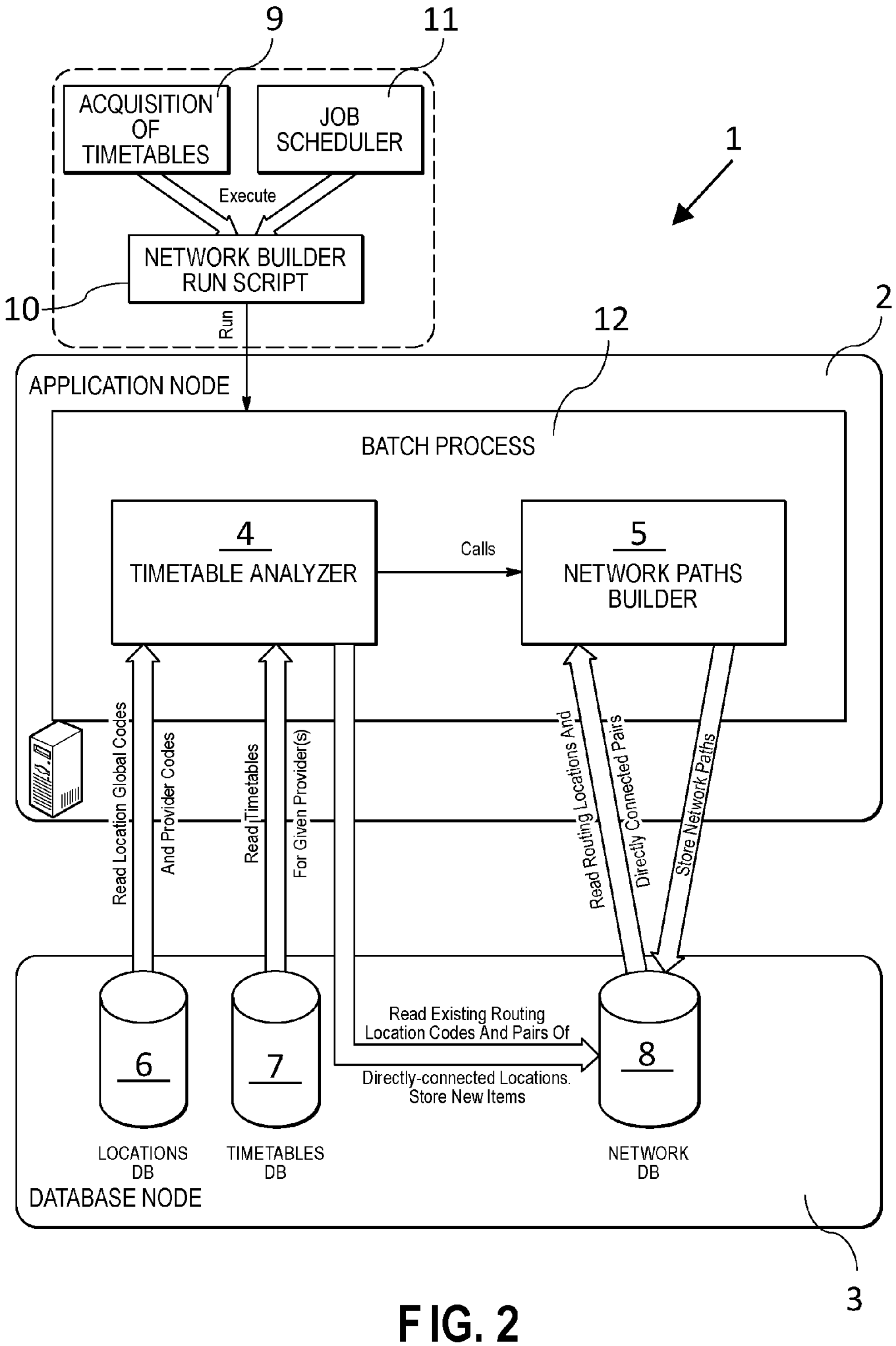
FIG. 2 is a schematic overview of an example of a computer system architecture.

Overview of an Example of a System Architecture; FIG. 2

FIG. 2 provides an overview of an exemplary computer-system architecture 1 that may be used in some embodiments to automatically execute the process of building a representation of a ground-transportation network from timetable information. The architecture 1 is based on two main nodes, namely an application node 2 and a database node 3. The application node 2 is dedicated to applicative components; it also hosts a timetable analyzer 4 and a network paths builder 5, e.g. in the form of binaries libraries (e.g. a timetable analyzer library and a network paths builder library). The database node 3 is dedicated to data storage; it contains, for example, a location database 6, a timetable database 7, and a network database. The location database 6 contains lists of provider-defined location codes and translations of these codes into and from global location codes. The timetable database 7 contains timetables of ground-transportation providers. The network database 8 contains routing location codes, pairs of directly-connected routing locations, and network paths.

Acquisition of timetables 9 is a process dedicated to the retrieval of timetables from transportation service providers. The Acquisition of timetables 9 can trigger the execution of a network builder run script 10. The network builder run script 10 can also be triggered by a job scheduler 11, which is a generic scheduler daemon adapted to trigger the network builder run script 10 according to a given schedule. In some embodiments the job scheduler causes periodic updates of the representation of a ground-transportation network when it is in the maintenance phase; it may provide a list of transportation providers whose services need to be updated. The network builder run script 10 initializes a batch process 12, which is a part of the application node 2. The network builder run script 10 is adapted to provided input arguments (e.g. transportation provider lists) to the batch process 12 and to receive an exit code (e.g indicating success or failure) from the batch process 12.

The batch process 12 comprises the timetable analyzer 4 and the network path builder 5. The timetable analyzer 4 computes a list of routing locations and pairs of directly-connected routing locations by analyzing timetables and location codes. It retrieves timetable information for one or more transportation providers, along with global location code translations for provider locations, from the location database 6 and the timetable database 7. It can read existing routing location codes and pairs of directly-connected routing locations from the network database 8 and store computed items there. The network paths builder is adapted to read routing location codes and pairs of directly-connected routing locations from the network database, compute network paths, and store them in the network database 8.

The entities 1 to 12 described so far may be software components (computer programs, data bases) in the form of computer program instructions or data stored on a non-transitory computer-readable storage medium, such as an optical, magnetic, or semi-conductor-based storage medium.

Figure 3:
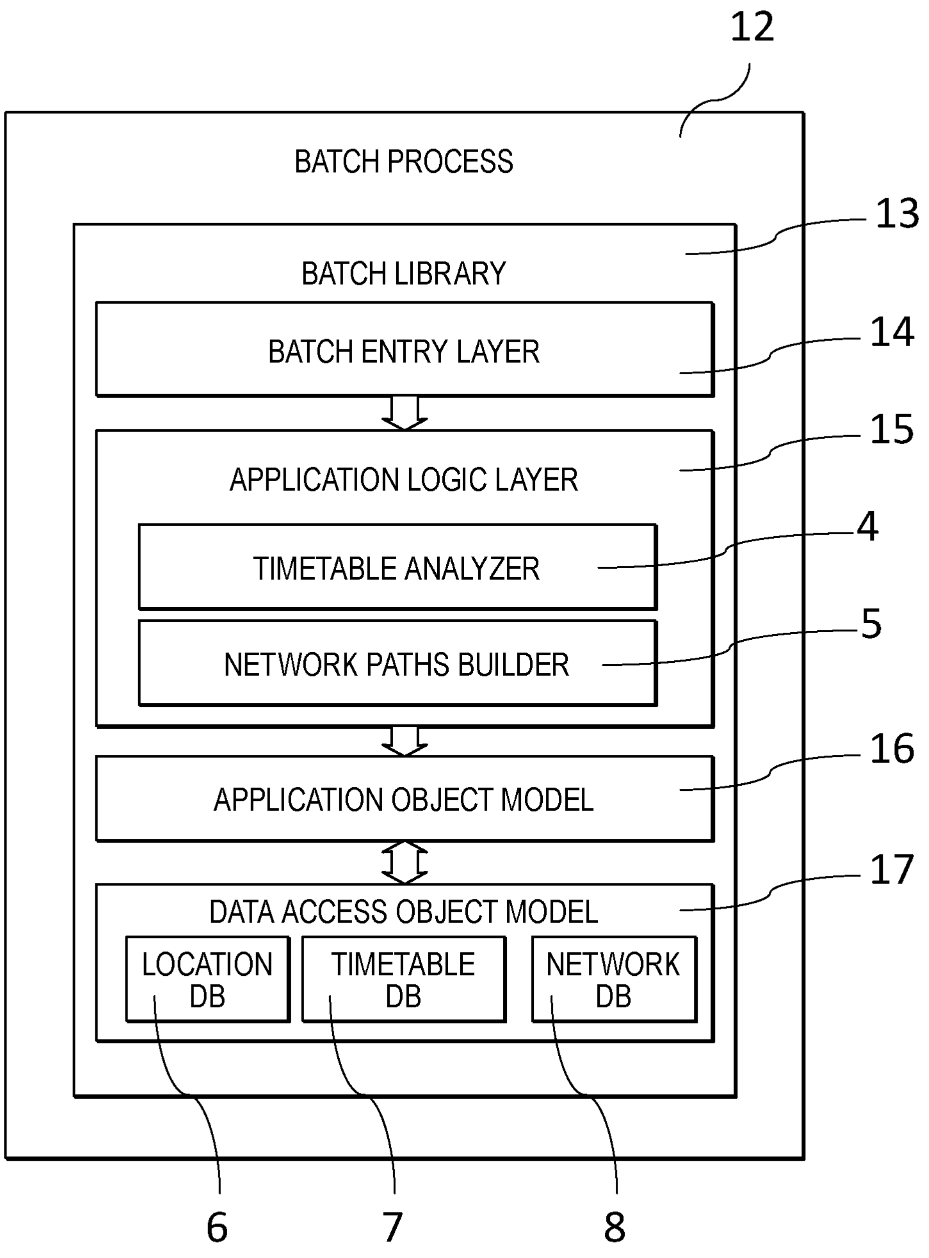
FIG. 3 shows a scheme of an exemplary high-level design of a batch process.

Exemplary High-Level Design of the Batch Process 12; FIG. 3

FIG. 3 illustrates an exemplary high level design of the batch process 12 of FIG. 2. The batch process 12 is represented by a binary batch library 13. The batch library 13 comprises a batch entry layer 14, an application logic layer 15, an application object model 16, and a data access object model 17.

The batch entry layer 13 initializes connections to the databases, processes input parameters, and calls the application logic code. The application logic layer 15 contains the applicative code; for example, it may comprise the time table analyzer 4 and the network paths builder 5 (FIG. 2). The application object model 16 is a set of classes that represent data in memory read from the databases and manipulated by the business logic layer 15, independently from the input data format. The data access object model 17 is responsible for accessing the databases (the location database 6, the timetable data base 7, and the network database 8 (FIG. 2), which are not part of the batch process 12 itself); to this end it contains database queries (e.g. in the form of SQL queries) and program classes to access the database tables (e.g. in the form of C++ classes).

The entities 12 to 17 may be software components in the form of computer program instructions or data stored on a non-transitory computer-readable storage medium, such as an optical, magnetic, or semi-conductor based storage medium.

Figure 4:
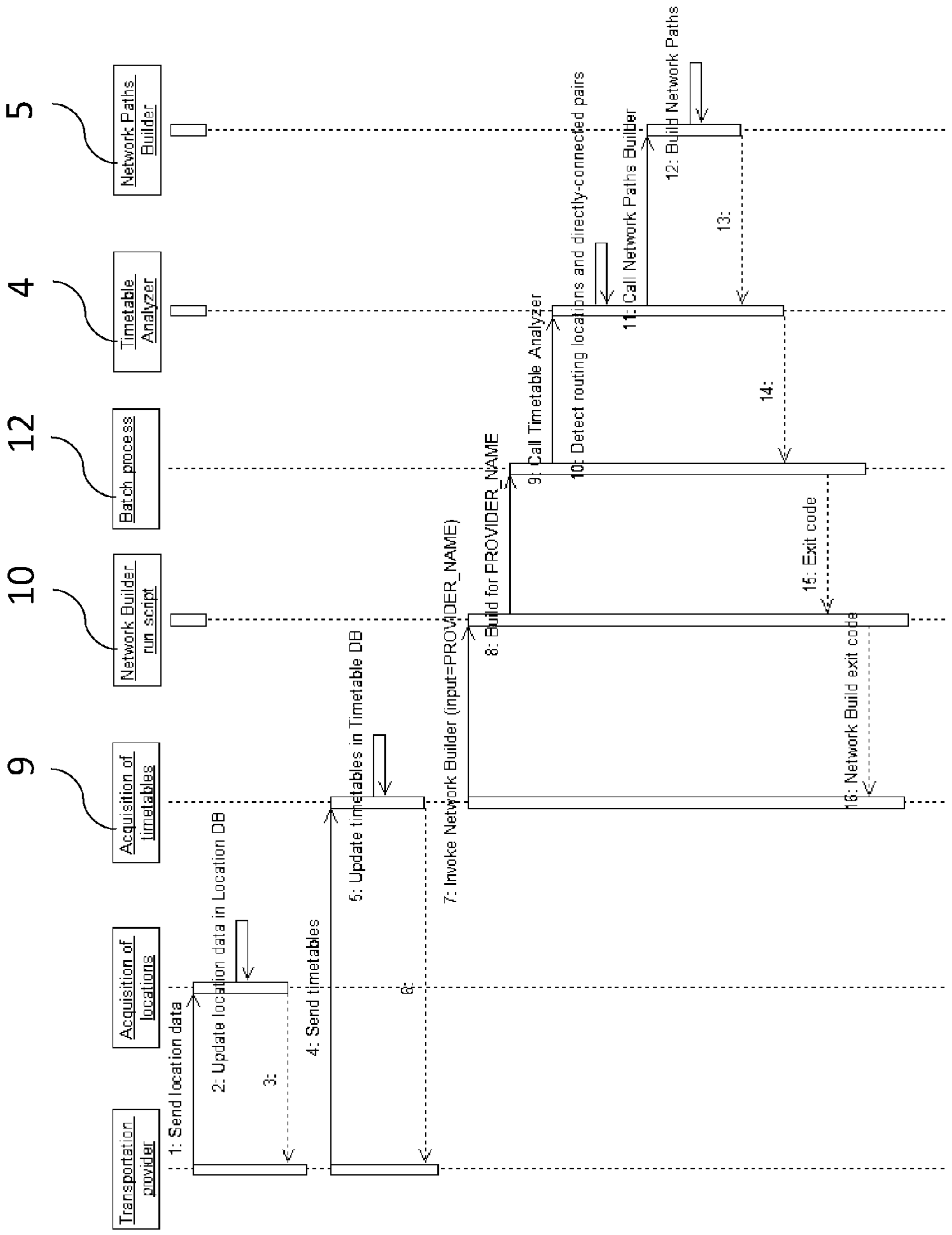
FIG. 4 illustrates building a network representation.

Building a Network Representation Triggered by Acquisition of Timetables; FIG. 4

In the following description of FIG. 4, reference numerals "n" of FIG. 4 are referred to as "4.*n*"; for example, reference numeral "10" in FIG. 4 is referred to as "4.10".

FIG. 4 is a protocol diagram illustrating a run mode of the system illustrated by FIGS. 2 and 3 in which building a network representation is triggered by the acquisition of new timetables, which may, for example, be used in the incremental phase. The process may be limited to one or more particular transportation providers, so that only that part of the network representation referring to this/these network provider(s) is built. In FIG. 4 the time is running from top to bottom. The entities involved in the process are shown in a header line above the diagram.

The process of FIG. 4 may optionally start at 4.1 by the transportation provider sending location data. An entity referred to as "Acquisition of locations" updates the location data in the locations database 6 at 4.2, and sends a return code to the transportation provider, at 4.3.

At 4.4, the transportation provider sends the timetables to the Acquisition of timetables 9, which updates the timetables in the timetables database 7 at 4.5, and sends a return code to the transportation provider, at 4.6.

At 4.7, the Acquisition of timetables 9 invokes the network builder run script 10, which is also briefly referred to as "network builder" in FIG. 4. As an input argument, the provider name(s), referred to as "PROVIDER_NAME", may be passed. At 4.8, the network builder run script 10 invokes the batch process 12 for the provider name(s) passed. At 4.9, the batch process 12 calls the timetable analyzer 4 which, at 4.10, detects routing locations and directly connected pairs of routing locations. At 4.11, the timetable analyzer 4 calls the network paths builder 5, which builds the network paths at 4.12 and stores them in the network database 8.

Finally, return codes (exit codes) are returned in a chain from the network paths builder 5 to the timetable analyzer 4 at 4.13, from there to the batch process 12 at 4.14, from there to the network builder run script 10, and from there to the Acquisition of timetables 9.

Building a Network Representation Triggered by the Job Scheduler

Another run mode in which building the network representation is triggered by the job scheduler 11 (FIG. 2) is similar to what is shown in FIG. 4: The activities 4.1 to 4.6 are dispensed with, and the activity 4.7 is modified so that the job scheduler (rather than the Acquisition of timetables 9) invokes the network builder run script 10. As in FIG. 4, the network builder run script 10 passes the provider name(s) for which the network representation should be built as an input argument.

This run mode is suitable to have the network representation built on a given schedule, for example once a year; it is, e.g., used for the maintenance phase.

Figure 5:
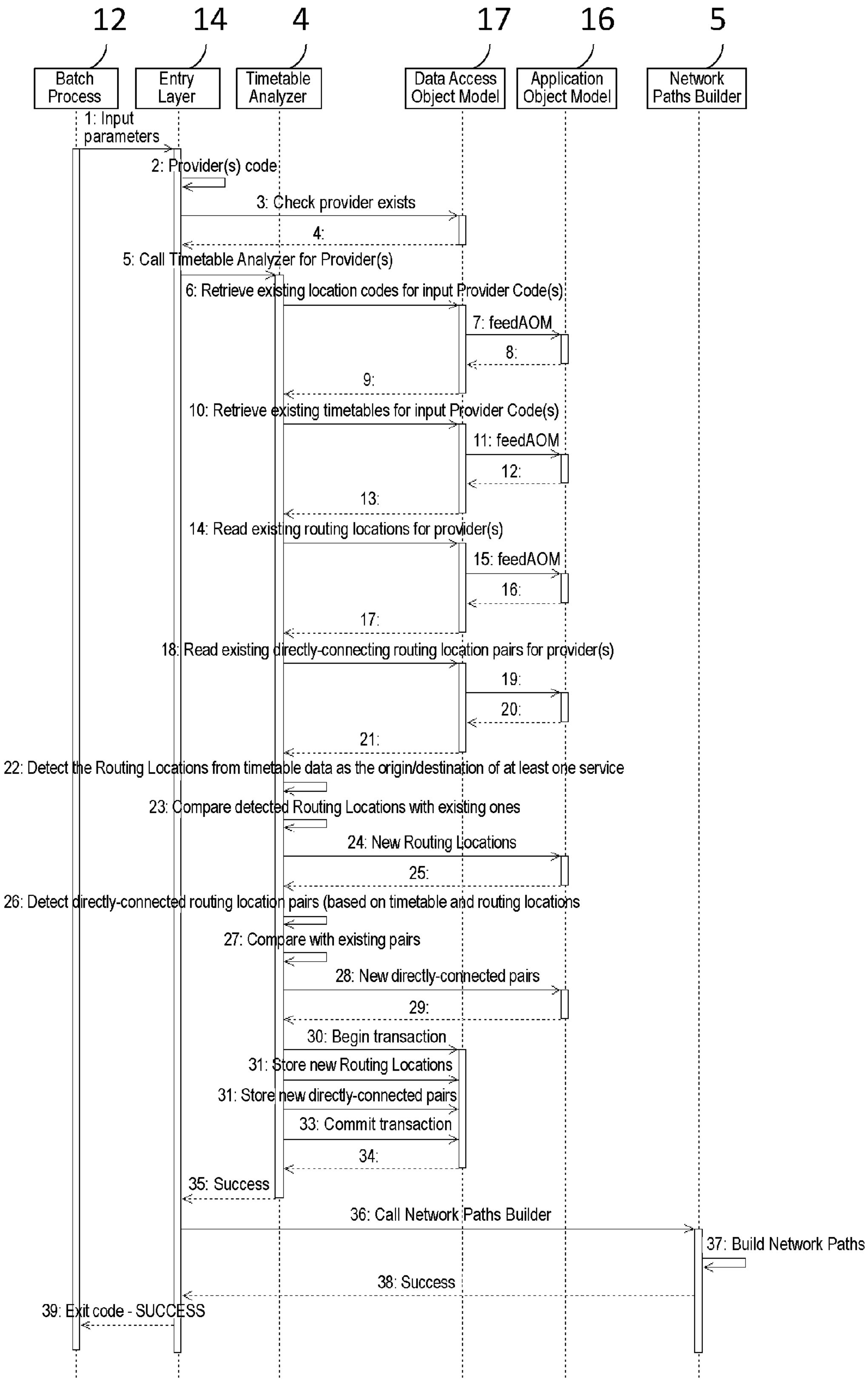
FIG. 5 illustrates an exemplary batch process and timetable analyzer workflow.

Batch Process and Timetable Analyzer Workflow; FIG. 5

FIG. 5 is a more detailed and exemplary illustration of the work flow of the batch process and timetable analyzer of FIGS. 2 to 4.

In the following description of FIG. 5, reference numerals "n" of FIG. 5 are referred to as "5.*n*"; for example, reference numeral "10" in FIG. 5 is referred to as "5.10".

At 5.1, the batch process 12 provides input data to the batch entry layer 14. The batch entry layer 14 detects one or more provider codes in the input data, at 5.2. At 5.3, the batch entry layer 14 ascertains whether the provider(s) exist(s) by inquiring the data access object model 17. The data access object model 17 returns a corresponding return code to the batch entry layer 14, at 5.4. At 5.5, the batch entry layer 14 calls the timetable analyzer 4 for the provider(s) at issue, by passing the provider code(s).

At 5.6, the timetable analyzer 4 retrieves existing location codes for the provider code(s) from the data access object model 17. The data access object model 17 feeds the application object model 16 with the requested data, at 5.11, receives a return code from the application object model 16, at 5.12, and returns a return code to the timetable analyzer, at 5.13.

At 5.14, the timetable analyzer 4 reads existing routing locations for the provider(s) from the data access object model 17. The data access object model 17 feeds the application object model 16 with the requested data, at 5.15, receives a return code from the application object model 16, at 5.16, and returns a return code to the timetable analyzer, at 5.17.

At 5.18, the timetable analyzer 4 reads existing directly-connected routing location pairs for the provider(s) from the data access object model 17. The data access object model 17 feeds the application object model 16 with the requested data, at 5.19, receives a return code from the application object model 16, at 5.20, and returns a return code to the timetable analyzer, at 5.21.

At 5.22, the timetable analyzer 4 detects the routing locations from the timetable data, as the origin or destination of at least one service, and compares the detected routing locations with existing ones, at 5.23. If the timetable analyzer 4 finds new routing locations it passes them to the application object model 16, at 5.24, and receives a return code from the application object model 16, at 5.25.

At 5.26, the timetable analyzer 4 detects directly-connected routing location pairs from the timetable data and the routing locations, and compares the detected pairs with already existing directly-connected routing location pairs, at 5.27. If the timetable analyzer 4 finds new directly-connected routing location pairs it passes them to the application object model 16, at 5.28, and receives a return code from the application object model 16, at 5.29.

At 5.30, the timetable analyzer 4 indicates the beginning of a transaction to the data access object model 17. This is only exemplary; in other implementation examples, a transaction may be initiated with the first read access to a data object, for example at 5.14 and/or 5.18; in some exemplary implementations, a transaction may be implicitly initiated along with an access, without a need to explicitly indicate the begin of a transaction.

At 5.31 and 5.32 the timetable analyzer 4 causes the data access object model 17 to store new routing locations and new directly-connected pairs of routing locations in the location database 6. At 5.33 the timetable analyzer 4 commits the transaction. At 5.34, the timetable analyzer 4 receives a return code from the data access object model 17 confirming that the transaction has been completed with success, and at 5.35 the timetable analyzer 4 returns a corresponding success code to the batch entry layer 14, in response to the original call at 5.5.

Thereupon, at 5.36, the batch entry layer 14 calls the network paths builder 5. The network paths builder 5 then builds the network paths, at 5.37, and, in the event of success, returns a success code to the batch entry layer 14 at 5.38. Finally, at 5.39, the batch entry layer 14 sends an exit code indicating success to the batch process 12, in response to the batch process's initial call at 5.1.

Exemplary Workflow of the Network Paths Builder 5; FIGS. 6 and 7

At 5.36 of FIG. 5 the network paths builder 5 is called. An exemplary workflow of the activities at 5.37, when the network paths builder 5 builds the network paths, is illustrated by FIG. 6.

FIG. 7 illustrates an exemplary adjacency map produced in the process of generating network paths of FIG. 6; it relates to the exemplary transportation services of FIG. 1 and the routing-location pairs and network paths listed in the Tables 2 and 3a.

In some embodiments, the network paths builder 5 is only executed if the timetable analyzer 4 has found new routing locations or new pairs of directly-connected routing locations.

The execution of the network paths builder 5 may involve the following main phases:

At 6.1, a new database transaction is started; as a consequence, if something fails during execution of the network path builder 5 so that the transaction cannot be committed, the previous network presentation will be re-established.

At 6.2, existing network paths are deleted from the network database 8; this means that all the network paths are newly determined, even if only one directly connected routing location pair has been added.

At 6.3, the maximum length of each network path is read; i.e. the maximum number of routing locations in a single network path; referred to as "MAX_PATH_LEN" in FIG. 6 (this activity can be moved forward, e.g. before the transaction is started at 6.1).

At 6.4, existing pairs of directly-connected routing locations are read from the network database 8.

At 6.5, an adjacency map containing the list of routing locations is created, without duplicates. For each routing location, a pointer to every other routing location which is adjacent to the first location is created; such a pointer is also referred to as an "adjacency link". An adjacency link is just a pointer to another routing location object. In some implementations, memory is only allocated once for each location. At the end of the creation of the adjacency map, routing locations having no links to any other routing location are removed from the map (if any). FIG. 7 illustrates an exemplary adjacency map relating to the exemplary transportation services of FIG. 1 and the routing-location pairs and network paths listed in the Tables 2 and 3a produced in the process of generating network paths of FIG. 6. In FIG. 7, the adjacency links are shown as data containers in the form of hashed boxes with a header part indicating the routing location to which the link points, and a data portion carrying the pointer itself, i.e. the address of the routing location to which the link points; the pointer itself is represented by an arrow pointing to the routing location at issue.

For each origin routing location in the map, all the possible paths to other routing locations are discovered by recursively following the pointers from the origin routing location to other routing locations. During the recursion, a stack is maintained to avoid cycles (i.e. visiting two times the same routing location for the same path). This part of the process starts at 6.6, where one location is selected from the adjacency map, referred to as "LOCATION_FROM". At 6.7 the location LOCATION_FROM is added to a stack. At 6.8, a location directly connected to "LOCATION_FROM" is selected, referred to as "LOCATION_TO". At 6.9, the location LOCATION_TO is added to the stack. At 6.10 and 6.11 it is ascertained whether the stack size is already greater than the maximum length of a network path, MAX_PATH_LEN, and if the location LOCATION_TO was already present in the stack, i.e. a cycle is found; if any of the answers is positive, the process will branch to 6.14. If both answers are negative, one network path, represented by the routing locations in the stack, is found at 6.12. At 6.13, LOCATION_TO is copied into LOCATION_FROM, and the flow returns to 6.7.

At 6.14, the location LOCATION_FROM is removed from the stack, and the last location in the stack (if any) becomes the new LOCATION_FROM. At 6.15 it is ascertained whether the stack is empty. If the answer is positive, it is ascertained at 6.16 whether there are more origin locations in the adjacency map. If the answer is positive, the building of one network path has been finished, and the network path is added to a database buffer at 6.17.

If the outcome at 6.15 is negative, i.e. if the stack is not empty, e.g. because the maximum path length was reached in 6.10, it is ascertained in 6.18 whether there are more routing locations directly connected to LOCATION_FROM. If the answer is positive the process returns to 6.8 and continues there; if it is negative, the process returns to 6.14.

The database buffer is filled with network paths finished at 6.17. At some point the database buffer will be full, and its content will be written out to the network database 8. To this end, it is ascertained at 6.19 whether the buffer is full. If the answer is negative the process returns to 6.17. If it is positive, i.e. if the buffer is full, the buffer content, i.e. the finished network paths in the buffer are written to the network database 8 at 6.20. The process then returns (at 6.21) to 6.17 to buffer further network paths, unless there are no further network paths to be stored. If there are no further network paths to be stored, the building of network paths has been completed, and the database transaction is committed at 6.22. The process started by calling the network paths builder 5 at 5.11 is finished, and the call is returned to the calling timetable analyzer with a return status code "SUCCESS" at 6.23.

Figure 8:
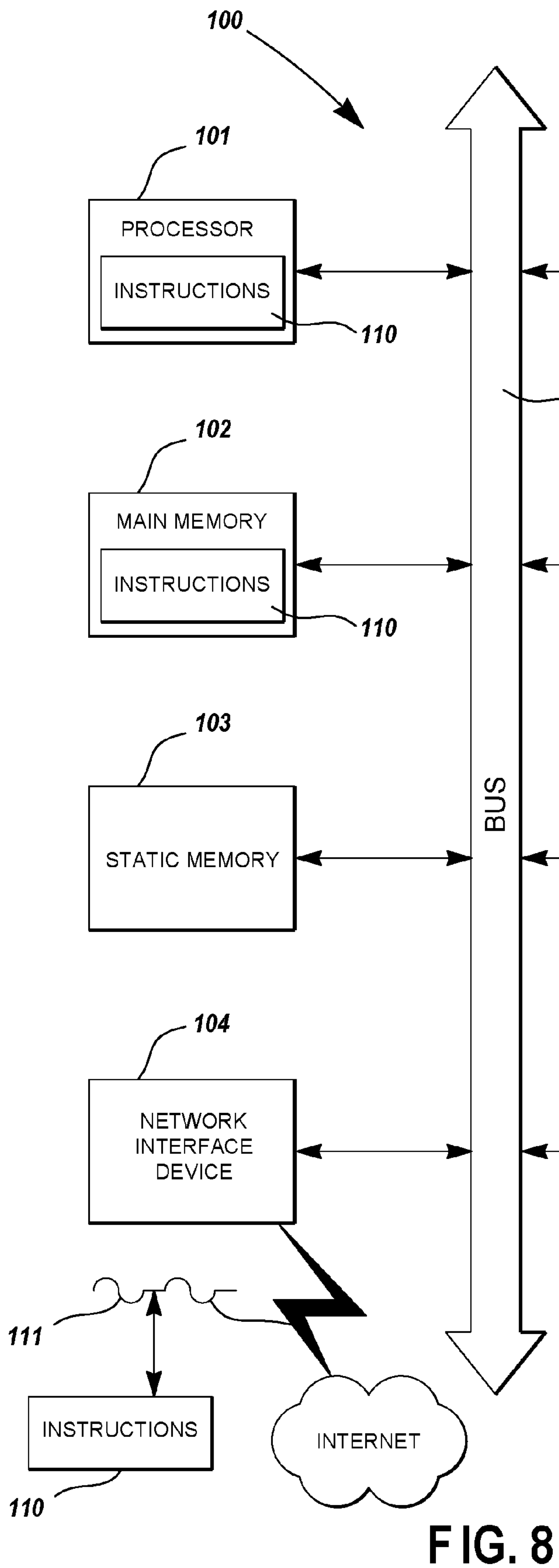
FIG. 8 shows an exemplary computer system arranged to carry out the methodologies described herein.

Computer System; FIG. 8

FIG. 8 is a diagrammatic representation of an exemplary computer system 100 arranged to host the application node 2 and, optionally the database node 3 and the elements 9, 10, 11 (FIG. 2), and arranged to execute a set of instructions, to cause it to perform any of the methodologies discussed herein. The computer system 100 includes a processor 101, a main memory 102 and a network interface 104. It further includes a static memory 103, e.g. non-removable flash and/or solid state drive and/or a removable Micro or Mini SD card, which permanently stores the software enabling the computer system 100 to execute its functions. Furthermore, it may include a display 106, a user interface control module 108 and/or an alpha-numeric and cursor input device 107. Optionally, additional I/O interfaces 109, such as card reader and USB interfaces may be present. In some embodiments the databases 6, 7, 8 are stored on the static memory 103; in other embodiments with external databases 6, 7, 8, e.g. implemented in a database client-server architecture, access to the databases 6, 7, 8 is performed via the network interface device 104.

An executable set of instructions (i.e. software) 110 embodying any one, or all, of the methodologies described above, resides completely, or at least partially, permanently in the non-volatile memory 103. When executed, corresponding process data resides in the main memory 102 and/or the processor 101. The software 110 may further be transmitted or received as a propagated signal 111 through the network interface device 104 from/to a software server within a local area network or the Internet.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

The program code embodied in any of the applications, modules, and/or components described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method of producing a representation of a ground-transportation network from timetable information of transportation services on the ground-transportation network, wherein the timetable information comprises end points and intermediate stop points of the transportation services, the method comprising:

determining routing locations from the timetable information by a computer, the routing locations comprising the end points of the transportation services;

forming tuples of directly-connected routing locations by the computer, wherein the tuples of the directly-connected routing locations are pairs of routing locations connected by a transportation service with no intermediate routing location where the transportation service stops; and generating network paths by linking the directly-connected routing locations, the entirety of the network paths forming the representation of the ground-transportation network, wherein the network paths are service-oriented and only represent travel opportunities based on the ground-transportation network, wherein generating the network paths comprises forming a graph on a video display by linking all the routing locations with the routing locations to which the routing locations are directly connected, and performing graph traversal to find all the network paths in the graph, and wherein visiting a same routing location twice for the same network path is excluded.

2. The method of claim 1, wherein the end points in the timetable information are not required to be represented by unique location codes, and the method further comprises:

assigning the unique location codes to the end points in the timetable information based on the unique location codes.

3. The method of claim 2, wherein the timetable information comprises timetables from different transportation-service providers including one of: non-unique designations of locations, partial timetables, and non-accurate timetables.

4. The method of claim 1, wherein the routing locations the end points and all the intermediate stop points of the transportation services are taken as routing locations.

5. The method of claim 1, wherein only the end points of the transportation services are taken as the routing locations.

6. The method of claim 1, wherein crossing points are determined by the computer, and wherein the routing locations, the end points and the crossing points of the transportation services are taken as the routing locations.

7. The method of claim 1, wherein the graph traversal is one of a depth-first search and a breadth-first search.

8. The method of claim 1, further comprising determining additional information from the timetable information, the additional information comprising at least one of: a distance between two locations, a travel time of a transportation service between the two locations, a level of service onboard a transportation facility providing a transportation service, a level of access to the transportation facility, and a price of the transportation service; and associating the additional information with the representation of the ground-transportation network.

9. The method of claim 8, further comprising performing a travel-speed classification for segments of the ground-transportation network on the basis of additional distance information and travel-time information; and associating the travel-speed classification with the segments in the representation of the ground-transportation network.

10. The method of claim 1, wherein the routing locations determined from new timetable information are added to the routing locations that already exist so that existing routing-location information is updated.

11. The method of claim 1, wherein the tuples of the directly-connected routing location determined from new timetable information are added to the tuples of the directly-connected routing locations that already exist so that information for the directly-connected routing location is updated.

12. The method of claim 11, comprising one of: determining and deriving additional information from new timetable information, the additional information comprising at least one of: a distance between two locations, a travel time of a transportation service between two locations, a level of service onboard a transportation facility providing the transportation service, a level of access to the transportation facility, and a travel-speed classification; and associating the additional information with one of the routing locations, the tuples of the directly-connected routing locations, and updating the additional information already associated with one of the routing locations and the tuples of the directly-connected routing locations.

13. A computer system for producing a representation of a ground-transportation network from timetable information of transportation services on the ground-transportation network, wherein the timetable information comprises end points and stop points of the transportation services, the computer system comprising a processor being programmed to:

determine routing locations from the timetable information, the routing locations comprising the end points of the transportation services;

form tuples of directly-connected routing locations, wherein the tuples of the directly-connected routing locations are pairs of routing locations connected by a transportation service with no intermediate routing location where the transportation service stops; and generate network paths by linking the directly-connected routing locations, the entirety of the network paths forming the representation of the ground-transportation network, wherein the network paths are service-oriented and only represent travel opportunities based on the ground-transportation network, wherein generating the network paths comprises forming a graph on a video display by linking all the routing locations with the routing locations to which the routing locations are directly connected, and performing graph traversal to find all the network paths in the graph, and wherein visiting a same routing location twice for the same network path is excluded.

14. The computer system of claim 13, wherein the end points in the timetable information are not required to be represented by unique location codes, and wherein the method further comprises assigning the unique location codes to the end points in the timetable information based on the unique location codes.

15. The computer system of claim 13, wherein the routing locations the end points and all the intermediate stop points of the transportation services are taken as routing locations.

16. The computer system of claim 13, wherein only the end points of the transportation services are taken as the routing locations.

17. A computer program product comprising:

a non-transitory computer-readable storage medium having computer program instructions stored therein, which when executed on a computer cause a representation of a ground-transportation network to be produced from timetable information of transportation services on the ground-transportation network, wherein the timetable information comprises end points and stop points of the transportation services, by:

determining routing locations from the timetable information, the routing locations comprising the end points of the transportation services;

forming tuples of directly-connected routing locations, wherein the tuples of the directly-connected routing locations are pairs of routing locations connected by a transportation service with no intermediate routing location where the transportation service stops; and generating network paths by linking the directly-connected routine locations, the entirety of the network paths forming the representation of the ground-transportation network, wherein the network paths are service-oriented and only represent travel opportunities based on the ground-transportation network, wherein generating the network paths comprises forming a graph on a video display by linking all the routing locations with the routing locations to which the routing locations are directly connected, and performing graph traversal to find all the network paths in the graph, and wherein visiting a same routing location twice for the same network path is excluded.

* * * * *